US012687276B2

(12) United States Patent
Wang et al.

(10) Patent No.: US 12,687,276 B2
(45) Date of Patent: Jul. 21, 2026

(54) METHOD FOR CONTROLLING LIGHT EMITTING ASSEMBLY, LIGHT EMITTING ASSEMBLY, AND ELECTRONIC APPARATUS

(71) Applicant: Yinwang Intelligent Technologies Co., Ltd., Shenzhen (CN)

(72) Inventors: Peizhi Wang, Shanghai (CN); Yi Wang, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/816,094

(22) Filed: Aug. 27, 2024

(65) Prior Publication Data

US 2024/0418347 A1 Dec. 19, 2024

Related U.S. Application Data

(63) Continuation of application No. PCT/CN2022/130327, filed on Nov. 7, 2022.

(30) Foreign Application Priority Data

Feb. 28, 2022 (CN) .......................... 202210191940.8

(51) Int. Cl.
*F21V 9/40* (2018.01)
*B60Q 3/208* (2017.01)
(Continued)

(52) U.S. Cl.
CPC ................ *F21V 9/40* (2018.02); *B60Q 3/208* (2017.02); *F21K 9/61* (2016.08); *H05B 45/10* (2020.01);
(Continued)

(58) Field of Classification Search
CPC .. F21V 9/40; F21V 9/61; B60Q 3/208; H05B 45/10
See application file for complete search history.

(56) References Cited

U.S. PATENT DOCUMENTS

| 5,778,111 | A | 7/1998 | Vasiliadis et al. |
| 10,928,697 | B1 | 2/2021 | Mazuir et al. |

(Continued)

FOREIGN PATENT DOCUMENTS

| CN | 106104462 | A | 11/2016 |
| CN | 107110480 | A | 8/2017 |

(Continued)

OTHER PUBLICATIONS

Extended European Search Report in European Appln. No. 22928271.0, mailed on Apr. 7, 2025, 9 pages.
(Continued)

*Primary Examiner* — Bryon T Gyllstrom
(74) *Attorney, Agent, or Firm* — Fish & Richardson P.C.

(57) ABSTRACT

Light emitting assemblies and methods for controlling thereof are provided in this disclosure. In an implementation, a light emitting assembly includes: a first light transmission layer and a second light transmission layer that are stacked, a first light adjustment layer, disposed between the first light transmission layer and the second light transmission layer, and a first light source, wherein the first light source is located on a side of the first light adjustment layer, wherein the at least one first element is capable of emitting light emitted from the first light source to a side outside the second light transmission layer and away from the first light adjustment layer.

20 Claims, 7 Drawing Sheets

100

(1)                                                                          (2)

(51) Int. Cl.

| | |
|---|---|
| *F21K 9/61* | (2016.01) |
| *F21W 106/00* | (2018.01) |
| *F21Y 115/10* | (2016.01) |
| *H05B 45/10* | (2020.01) |

(52) U.S. Cl.
CPC ...... *F21V 2200/17* (2015.01); *F21W 2106/00* (2018.01); *F21Y 2115/10* (2016.08)

(56) References Cited

U.S. PATENT DOCUMENTS

| | | | | |
|---|---|---|---|---|
| 11,280,478 | B1* | 3/2022 | Chang | G02F 1/13439 |
| 2009/0244413 | A1* | 10/2009 | Ishikawa | G02F 1/13718 |
| | | | | 349/35 |
| 2012/0105508 | A1 | 5/2012 | Masuda | |
| 2013/0314453 | A1* | 11/2013 | Ko | G09G 5/10 |
| | | | | 345/102 |
| 2014/0035942 | A1* | 2/2014 | Yun | G06F 1/1637 |
| | | | | 345/592 |
| 2014/0204023 | A1* | 7/2014 | Kumar | G06F 3/005 |
| | | | | 345/156 |
| 2014/0293188 | A1* | 10/2014 | Chen | G09G 3/3426 |
| | | | | 349/86 |
| 2015/0002781 | A1* | 1/2015 | Ma | G02F 1/1347 |
| | | | | 349/62 |
| 2017/0310956 | A1* | 10/2017 | Perdices-Gonzalez | |
| | | | | G09G 3/2092 |
| 2020/0110214 | A1 | 4/2020 | Son et al. | |
| 2021/0164920 | A1* | 6/2021 | Liu | G01N 21/8806 |
| 2022/0134947 | A1* | 5/2022 | Wang | B60Q 3/745 |
| | | | | 362/488 |
| 2023/0333308 | A1* | 10/2023 | Kingman | G02B 6/0041 |
| 2024/0280741 | A1* | 8/2024 | Wittmann | G02B 6/0051 |
| 2024/0418347 | A1* | 12/2024 | Wang | H05B 45/10 |

FOREIGN PATENT DOCUMENTS

| | | | |
|---|---|---|---|
| JP | S61190583 | U | 11/1986 |
| JP | H05298979 | A | 11/1993 |
| JP | 2008241836 | A | 10/2008 |
| JP | 2012138330 | A | 7/2012 |
| KR | 101404301 | B1 | 6/2014 |
| WO | 2019074679 | A1 | 4/2019 |

OTHER PUBLICATIONS

International Search Report and Written Opinion and International Appln. No. PCT/CN2022/130327, mailed on Jan. 28, 2023, 20 pages (with English Translation).
Office Action in Japanese Appln. No. 2024-550721, mailed on Oct. 23, 2025, 14 pages (with English translation).

* cited by examiner

100

(1)

(2)

(1)

(2)

100

(1)                           (2)

100

(1)                                        (2)

S110

S113

S112

S112

S112

S1125

S1126

METHOD FOR CONTROLLING LIGHT EMITTING ASSEMBLY, LIGHT EMITTING ASSEMBLY, AND ELECTRONIC APPARATUS

CROSS-REFERENCE TO RELATED APPLICATIONS

This application is a continuation of International Application No. PCT/CN2022/130327, filed on Nov. 7, 2022, which claims priority to Chinese Patent Application No. 202210191940.8, filed on Feb. 28, 2022. The disclosures of the aforementioned applications are hereby incorporated by reference in their entireties.

TECHNICAL FIELD

This application relates to the field of display technologies, and in particular, to a method for controlling a light emitting assembly, a light emitting assembly, and an electronic apparatus.

BACKGROUND

With rapid development of electronic apparatuses, most electronic apparatuses have light emitting glass, for example, sunroof glass of a vehicle. The sunroof glass is a type of light emitting glass. The existing light emitting glass enables the electronic apparatus to provide various visual effects, such as a starry-sky effect, a blue-sky effect, or a natural landscape effect. In an existing method for preparing sunroof glass of a vehicle, laser engraving texture is usually formed inside the glass in a laser engraving manner, and lighting is performed on a side of the glass, to retain light at the laser engraving texture by using a light guide feature of the glass, so that a light emitting image is formed on the glass. However, the laser engraving texture formed inside the glass is monotonous, leading to a monotonous visual effect of the sunroof glass of the vehicle.

SUMMARY

Embodiments of this application provide a method for controlling a light emitting assembly, a light emitting assembly, and an electronic apparatus, to form a plurality of different light emitting images, so as to achieve a plurality of visual effects.

According to a first aspect, an embodiment of this application provides a light emitting assembly. The light emitting assembly includes a first light transmission layer and a second light transmission layer that are stacked, and the light emitting assembly may further include a first light adjustment layer and a first light source. The first light adjustment layer is disposed between the first light transmission layer and the second light transmission layer, a first element group is disposed at the first light adjustment layer, the first element group includes at least one first element, and transparency of the at least one first element is adjustable. The first light source is located on a side of the first light adjustment layer. The at least one first element is capable of emitting light emitted by the first light source to a side that is outside the second light transmission layer and that is away from the first light adjustment layer. In this embodiment of this application, the transparency of the at least one first element in the first element group is adjusted, and light is irradiated on these first elements, so that a plurality of light emitting images can be presented.

Transparency adjustment may be performed on a plurality of first elements as a whole, or transparency of first elements in the plurality of first elements may be independently adjusted.

The plurality of first elements may be arranged at the first light adjustment layer to form a preset image, for example, a triangle, a five-pointed star, or the like. Certainly, the plurality of first elements may alternatively be arranged in an array at the first light adjustment layer.

In some specific implementations, the light emitting assembly may further include: a second light adjustment layer, disposed between the first light transmission layer and the second light transmission layer, where a second element group is disposed at the second light adjustment layer, the second element group includes at least one second element, and transparency of the at least one second element is adjustable; and a second light source, where the second light source is located on a side of the second light adjustment layer. The at least one second element is capable of emitting light emitted by the second light source to a side that is outside the second light transmission layer and that is away from the second light adjustment layer.

In this embodiment of this application, the transparency of the first elements in the first element group is adjusted, so that when the first light source irradiates the first elements, a first image is presented under an action of the first elements. In addition, transparency of second elements in the second element group is adjusted, so that when the second light source irradiates the second elements, a second image is presented under an action of the second elements. The first image and the second image are superimposed to present a light emitting image. Therefore, the transparency of the first elements in the first element group and the transparency of the second elements in the second element group are separately adjusted, so that more abundant light emitting images can be presented, and a user requirement can be better met.

In a specific implementation, the transparency of the first elements in the first element group may be independently adjusted, and the first elements in the first element group are arranged in an array at the first light adjustment layer. When the transparency of the first elements in the first element group changes independently, the light emitted by the first light source is irradiated on different first elements, to present different light emitting images. In this way, more light emitting images can be presented, and the presented light emitting images can better meet a user requirement, so that visual experience of a user is richer.

In a specific implementation, the first light source includes at least one LED light, and the at least one LED light is arranged on at least one side of the light emitting assembly. The light emitting assembly may further include a light emitting circuit, configured to control at least one LED light in the LED light to emit light.

In a specific implementation, the light emitting circuit is further configured to control luminance and a wavelength of the light emitted by the at least one LED light. In this embodiment of this application, the luminance and the wavelength of the light emitted by the at least one LED light are controlled, so that the luminance and a color of the emitted light are adjustable. Therefore, a requirement of the user for the light emitting image can be met, and more abundant and colorful light emitting images can be obtained.

In a specific implementation, the light emitting assembly further includes a light guide structure, disposed at the first light adjustment layer. The light guide structure is configured to transmit light from the first light source to the at least one first element. In this embodiment of this application, the light guide structure can precisely transmit light to a specified element, to obtain a more precise light emitting image, thereby meeting the requirement of the user for the light emitting image.

In a specific implementation, the light guide structure includes a plurality of optical fibers, disposed at the first light adjustment layer, and distributed between the first elements in the first element group, where a plurality of first elements in the first element group are in a one-to-one correspondence with the plurality of optical fibers. When each element corresponds to one optical fiber, lighting of each element may be precisely controlled, so that more light emitting images can be generated, and precision of the light emitting image can be improved. In addition, local elements can be precisely illuminated, so that the light emitting assembly locally emits light.

According to a second aspect, an embodiment of this application provides a method for controlling a light emitting assembly. The light emitting assembly includes a first light transmission layer and a second light transmission layer that are stacked. The light emitting assembly may further include: a first light adjustment layer, disposed between the first light transmission layer and the second light transmission layer, where a first element group is disposed at the first light adjustment layer, the first element group includes at least one first element, and transparency of the at least one first element is adjustable; and a first light source, where the first light source is located on a side of the first light adjustment layer. The at least one first element is capable of emitting light emitted by the first light source to a side that is outside the second light transmission layer and that is away from the first light adjustment layer. The method may include: obtaining a first operation of a user; adjusting, in response to the first operation, transparency of the at least one first element in the first element group at the first light adjustment layer of the light emitting assembly; and controlling the first light source of the light emitting assembly to emit light. In this embodiment of this application, the transparency of the at least one first element in the first element group is adjusted, and light is irradiated on these first elements, so that a plurality of light emitting images can be presented.

In a specific implementation, the controlling the first light source of the light emitting assembly to emit light may be specifically: obtaining a second operation of the user; determining, in response to the second operation, a first position that is on the light emitting assembly and that corresponds to the user or a first body part of the user; and driving, based on the first position, the light emitted by the first light source to be irradiated on one or a plurality of elements located in the first position. The plurality of elements emit the light emitted by the first light source to space in which the user or the first body part of the user is located, thereby lighting local space. In addition, when the user or the first body part of the user moves, an element irradiated by the light emitted by the first light source also changes correspondingly. Therefore, the light emitted by the first light source moves with movement of the user, thereby achieving a light tracking effect.

In a specific implementation, the controlling the first light source of the light emitting assembly to emit light may be: obtaining a third operation of the user; and adjusting, in response to the third operation, luminance and a wavelength of the light emitted by the first light source. In this embodiment of this application, the luminance and the wavelength of the light emitted by the first light source are adjusted, so that the luminance and a color of the emitted light are adjustable. Therefore, a requirement of the user for the light emitting image can be met, and more abundant and colorful light emitting images can be obtained.

In a specific implementation, the first light source includes at least one LED light; and the adjusting, in response to the third operation, luminance and a wavelength of the light emitted by the first light source is specifically: adjusting, in response to the third operation, luminance and a wavelength of light emitted by the at least one LED light.

In a specific implementation, the controlling the first light source of the light emitting assembly to emit light is specifically: collecting first information, where the first information represents information about an environment and/or an electronic apparatus; and driving, based on the first information, the first light source to emit light. The environment may be weather, a location, a time, or the like. The information about the electronic apparatus may be information that changes the information about the electronic apparatus. For example, the electronic apparatus is a vehicle, and the information about the electronic apparatus may include a quantity of persons in the vehicle, an age range of the persons, and the like.

In this embodiment of this application, the information about the environment or the vehicle is collected, so that transparency of an element may be adjusted based on the information about the environment or the vehicle, and a light source may be driven to emit light. In this way, an obtained light emitting image can be more occasional.

In a specific implementation, the light emitting assembly may further include: a second light adjustment layer, disposed between the first light transmission layer and the second light transmission layer, where a second element group is disposed at the second light adjustment layer, the second element group includes at least one second element, and transparency of the at least one second element is adjustable; and a second light source, where the second light source is located on a side of the second light adjustment layer. The at least one second element is capable of emitting light emitted by the second light source to a side that is outside the second light transmission layer and that is away from the second light adjustment layer. The method further includes: obtaining a fourth operation of the user; adjusting, in response to the fourth operation, transparency of at least one second element in the second element group at the second light adjustment layer of the light emitting assembly; and controlling the second light source of the light emitting assembly to emit light.

In this embodiment of this application, the transparency of the first elements in the first element group is adjusted, so that when the first light source irradiates the first elements, a first image is presented under an action of the first elements. In addition, transparency of second elements in the second element group is adjusted, so that when the second light source irradiates the second elements, a second image is presented under an action of the second elements. The first image and the second image are superimposed to present a light emitting image. Therefore, the transparency of the first elements in the first element group and the transparency of the second elements in the second element group are separately adjusted, so that more abundant light emitting images can be presented, and a user requirement can be better met.

In a specific implementation, the transparency of the first elements in the first element group may be independently adjusted, and the first elements in the first element group are arranged in an array at the first light adjustment layer. When the transparency of the first elements in the first element group changes independently, the light emitted by the first light source is irradiated on different first elements, to present different light emitting images. In this way, more light emitting images can be presented, and the presented light emitting images can better meet a user requirement, so that visual experience of a user is richer.

In a specific implementation, the first light source includes at least one LED light, and the at least one LED light is arranged on at least one side of the light emitting assembly. The light emitting assembly further includes a light emitting circuit, configured to control at least one LED light in the LED light to emit light.

In a specific implementation, the light emitting assembly further includes a light guide structure, disposed at the first light adjustment layer, where the light guide structure is configured to transmit the light emitted by the first light source to the at least one first element. In this embodiment of this application, the light guide structure can precisely transmit light to a specified element, to obtain a more precise light emitting image, thereby meeting the requirement of the user for the light emitting image.

According to a third aspect, an embodiment of this application provides an electronic apparatus, where the electronic apparatus further includes: a light emitting assembly, one or more processors, and one or more memories. The light emitting assembly and the memory are coupled to the processor, the memory is configured to store computer program code, the computer program code includes computer instructions, and when the processor reads the computer instructions from the memory, the electronic apparatus is enabled to perform the following operations: adjusting transparency of at least one first element in a first element group at a first light adjustment layer of the light emitting assembly; and controlling light emitted by a first light source of the light emitting assembly to be irradiated on the at least one first element, where the at least one first element is configured to emit the light to a side that is outside a second light transmission layer of the light emitting assembly and that is away from the first light adjustment layer. In this embodiment of this application, the transparency of the at least one first element in the first element group is adjusted, and light is irradiated on these first elements, so that a plurality of light emitting images can be presented.

In a specific implementation, the light emitting assembly includes a first light transmission layer and a second light transmission layer that are stacked. The light emitting assembly may include: a first light adjustment layer, disposed between the first light transmission layer and the second light transmission layer, where a first element group is disposed at the first light adjustment layer, the first element group includes at least one first element, and transparency of the at least one first element is adjustable; and a first light source, where the first light source is located on a side of the first light adjustment layer.

In a specific implementation, the light emitting assembly further includes: a second light adjustment layer, disposed between the first light transmission layer and the second light transmission layer, where a second element group is disposed at the second light adjustment layer, the second element group includes at least one second element, and transparency of the at least one second element is adjustable; and a second light source, where the second light source is located on a side of the second light adjustment layer. The at least one second element is capable of emitting light emitted by the second light source to a side that is outside the second light transmission layer and that is away from the second light adjustment layer. The electronic apparatus further performs the following operations: adjusting the transparency of the at least one second element; and controlling the light emitted by the second light source to be irradiated on the at least one second element.

In this embodiment of this application, the transparency of the first elements in the first element group is adjusted, so that when the first light source irradiates the first elements, a first image is presented under an action of the first elements. In addition, transparency of second elements in the second element group is adjusted, so that when the second light source irradiates the second elements, a second image is presented under an action of the second elements. The first image and the second image are superimposed to present a light emitting image. Therefore, the transparency of the first elements in the first element group and the transparency of the second elements in the second element group are separately adjusted, so that more abundant light emitting images can be presented, and a user requirement can be better met.

In a specific implementation, the transparency of the first elements in the first element group may be independently adjusted, and the first elements in the first element group are arranged in an array at the first light adjustment layer. When the transparency of the first elements in the first element group changes independently, the light emitted by the first light source is irradiated on different first elements, to present different light emitting images. In this way, more light emitting images can be presented, and the presented light emitting images can better meet a user requirement, so that visual experience of a user is richer.

In a specific implementation, the first light source includes at least one LED light, and the at least one LED light is arranged on at least one side of the light emitting assembly. The light emitting assembly further includes a light emitting circuit, configured to control at least one LED light in the LED light to emit light.

In a specific implementation, the electronic apparatus further includes one or more sensors. The sensors are coupled to the processor, and the electronic apparatus further performs the following operations: receiving a first operation of a user; and driving, in response to the first operation, the first light source to emit light.

In a specific implementation, the electronic apparatus further performs the following operations: determining, in response to the first operation, a first position that is on the light emitting assembly and that corresponds to the user or a first body part of the user; and driving, based on the first position, the light emitted by the first light source to be irradiated on one or a plurality of elements located in the first position. The plurality of elements emit the light emitted by the first light source to space in which the user or the first body part of the user is located, thereby lighting local space. In addition, when the user or the first body part of the user moves, an element irradiated by the light emitted by the first light source also changes correspondingly. Therefore, the light emitted by the first light source moves with movement of the user, thereby achieving a light tracking effect.

In a specific implementation, the electronic apparatus further performs the following operations: receiving a second operation of the user; and adjusting, in response to the second operation, luminance and a wavelength of the light emitted by the first light source. In this embodiment of this application, the luminance and the wavelength of the light emitted by the first light source are controlled, so that the luminance and a color of the emitted light are adjustable. Therefore, a requirement of the user for the light emitting image can be met, and more abundant and colorful light emitting images can be obtained.

In a specific implementation, the first light source includes at least one LED light, and the electronic apparatus further performs the following operation: adjusting, in response to the second operation, luminance and a wavelength of light emitted by the at least one LED light.

In a specific implementation, the electronic apparatus further performs the following operations: collecting first information, where the first information represents information about an environment and/or an electronic apparatus; and driving, based on the first information, the first light source to emit light. The environment may be weather, a location, a time, or the like. The information about the electronic apparatus may be information that changes the information about the electronic apparatus. For example, the electronic apparatus is a vehicle, and the information about the electronic apparatus may include a quantity of persons in the vehicle, an age range of the persons, and the like.

In this embodiment of this application, the information about the environment or the vehicle is collected, so that transparency of an element may be adjusted based on the information about the environment or the vehicle, and a light source may be driven to emit light. In this way, an obtained light emitting image can be more occasional.

In a specific implementation, the light emitting assembly further includes a light guide structure, disposed at the first light adjustment layer. The light guide structure is configured to transmit, to the at least one first element, light emitted by a light source. In this embodiment of this application, the light guide structure can precisely transmit light to a specified element, to obtain a more precise light emitting image, thereby meeting the requirement of the user for the light emitting image.

According to a fourth aspect, a vehicle is provided. The vehicle includes the light emitting assembly according to the first aspect.

According to a fifth aspect, a computer-readable storage medium is provided, including computer instructions. When the computer instructions are run on an electronic apparatus, the electronic apparatus is enabled to perform the method according to any one of the second aspect and the possible implementations of the second aspect.

According to a sixth aspect, a computer program product is provided. When the computer program product runs on a computer, the computer is enabled to perform the method in any one of the second aspect and the possible implementations of the second aspect.

According to a seventh aspect, a chip system is provided, including a processor. When the processor executes instructions, the processor performs the method in any one of the second aspect and the possible implementations of the second aspect.

BRIEF DESCRIPTION OF DRAWINGS

To describe the technical solutions in embodiments of this application more clearly, the following briefly describes the accompanying drawings for describing embodiments or the conventional technology. The accompanying drawings in the following description show merely some embodiments of this application, and persons of ordinary skill in the art may still derive other drawings from these accompanying drawings without creative efforts.

Figure 5:
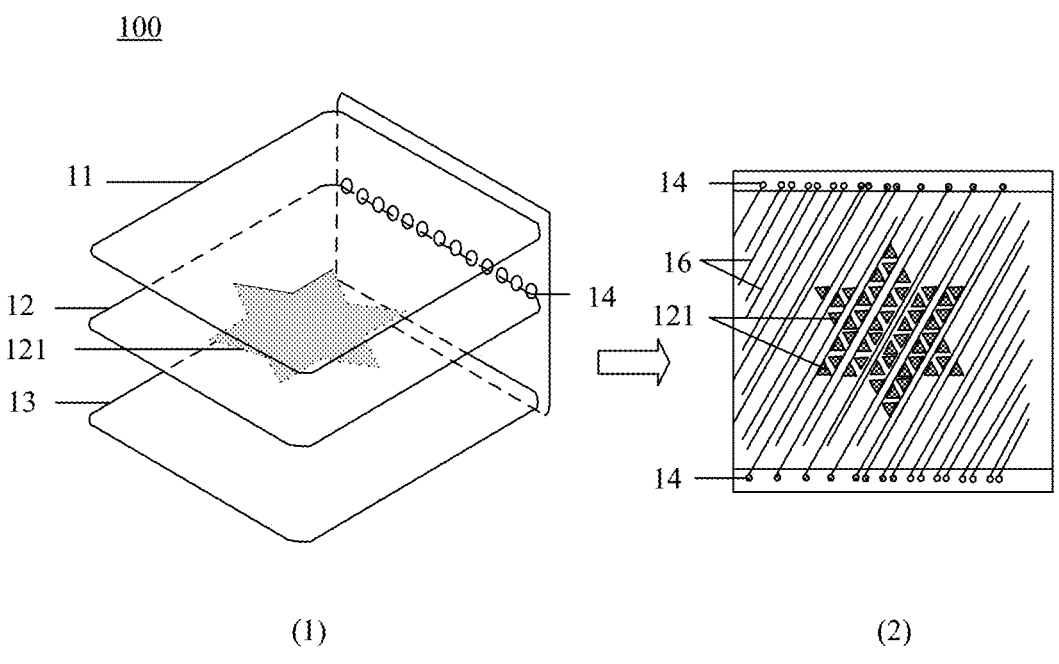
Figure 6:
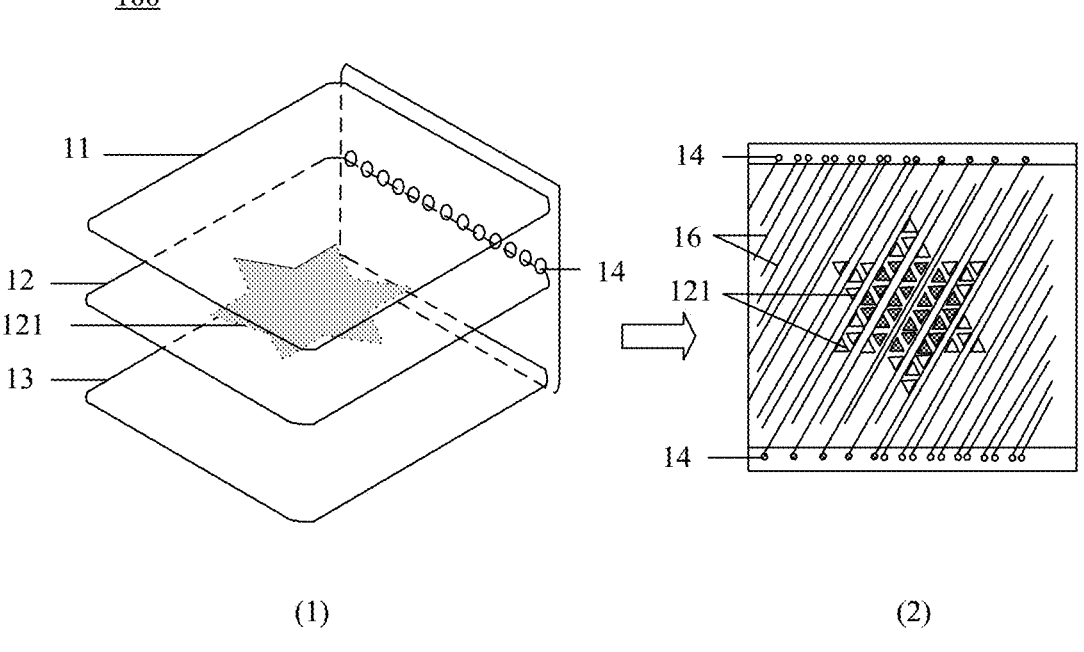
Figure 7:
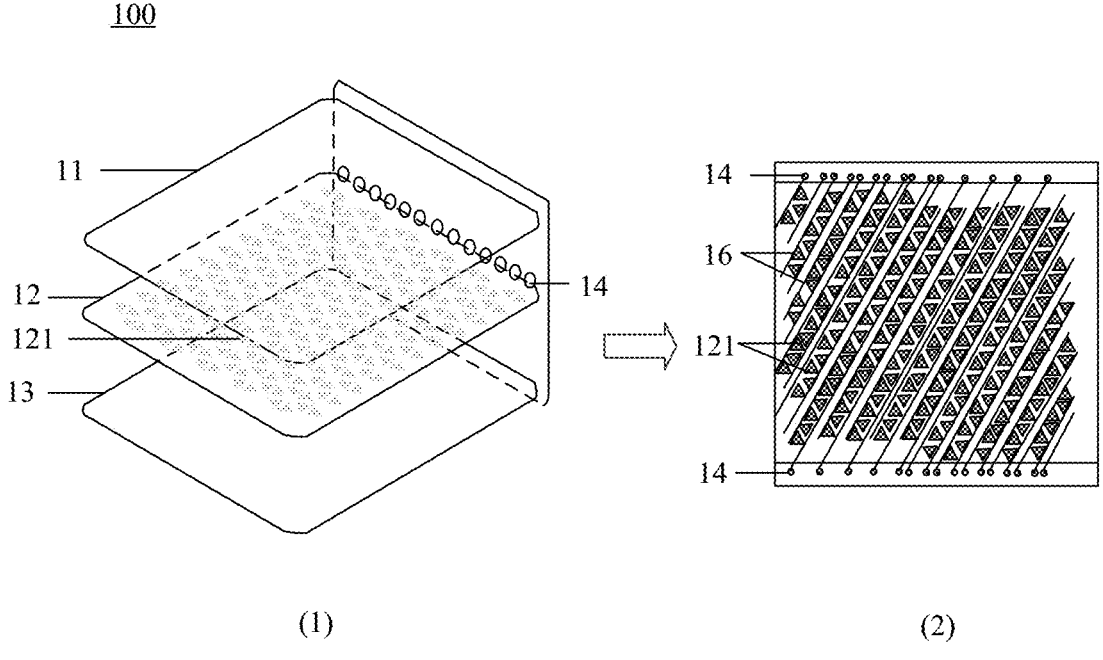
Figure 8:
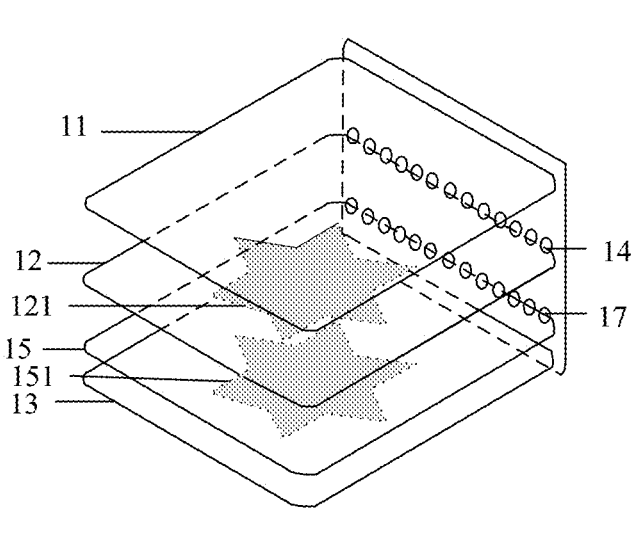
Figure 9:
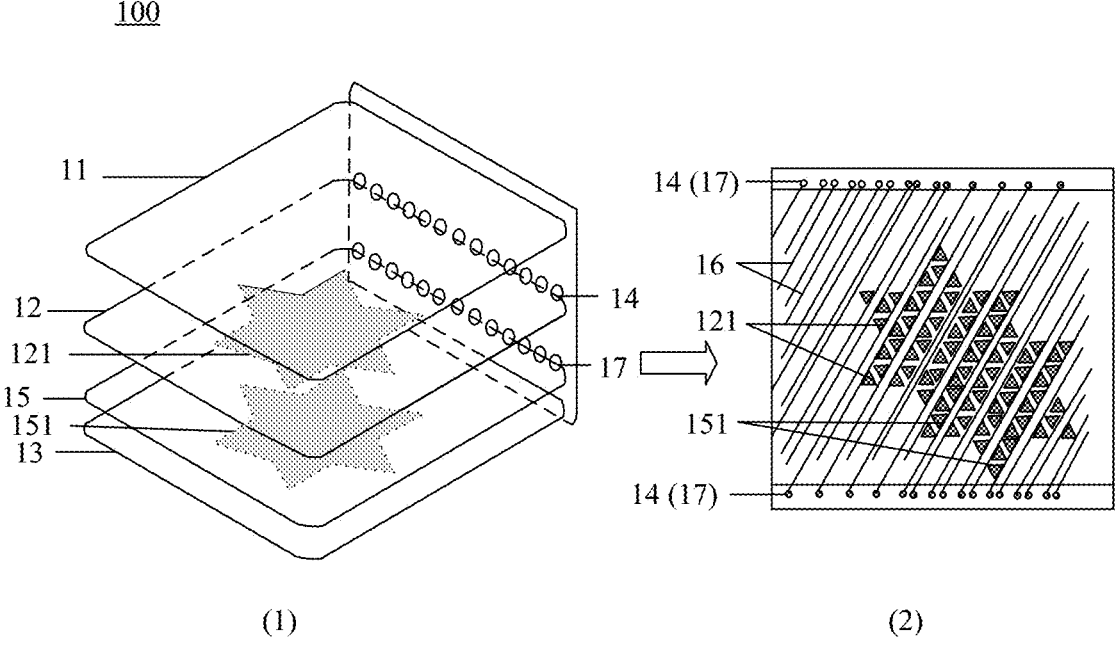
Figure 10:
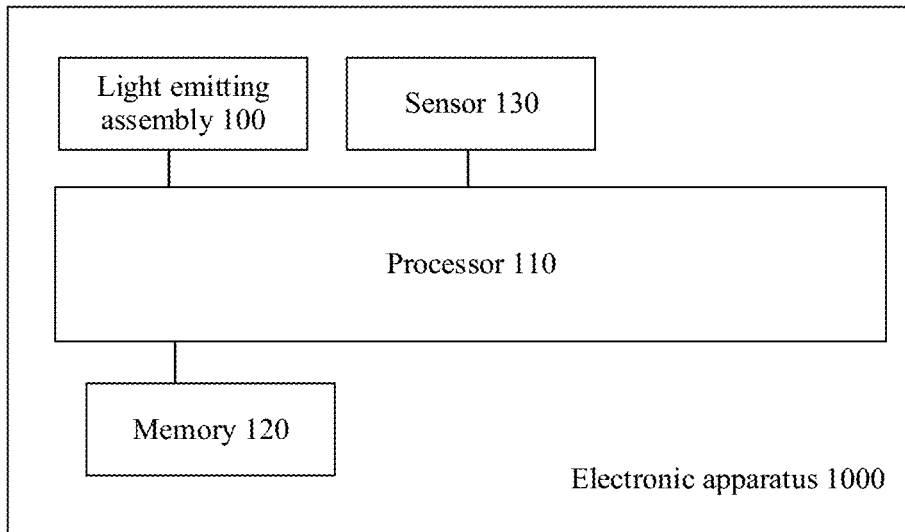
Figure 11A:
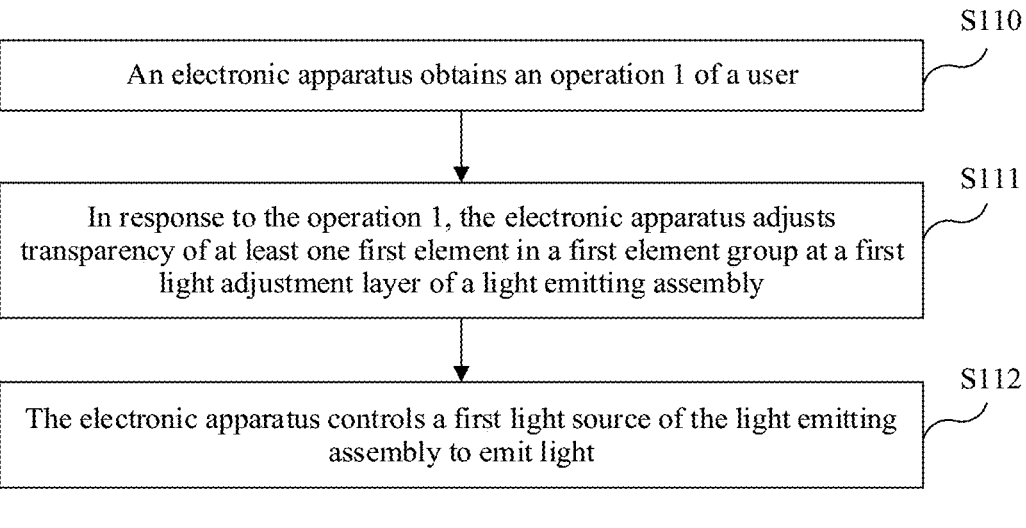
Figure 11B:
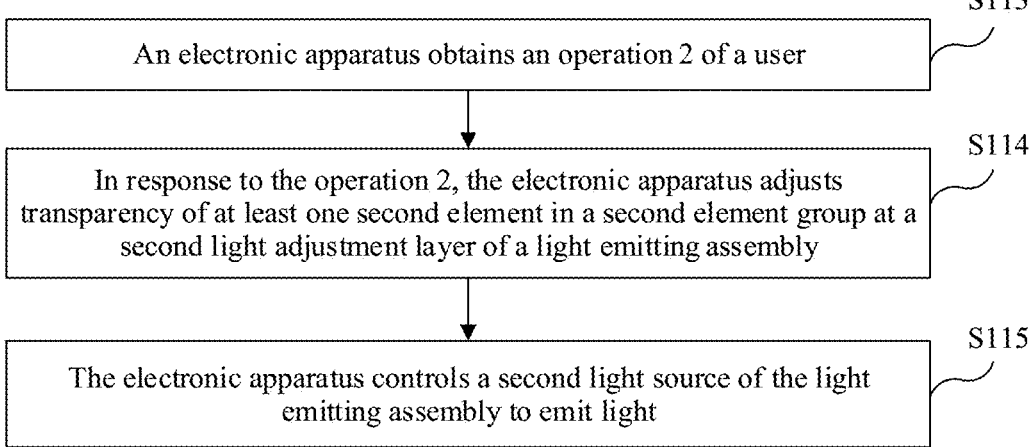
Figure 11C:
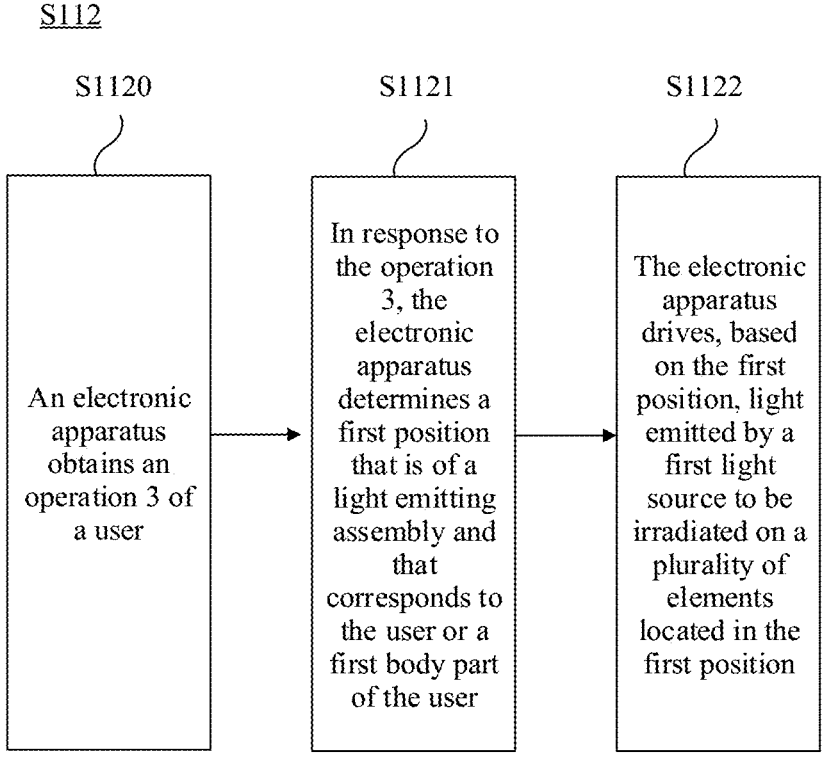
Figure 11D:
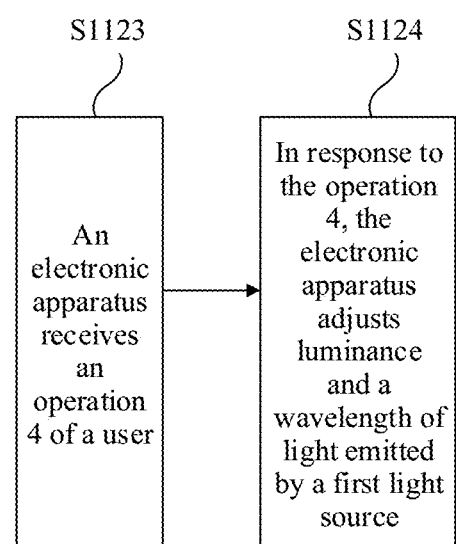
Figure 11E:
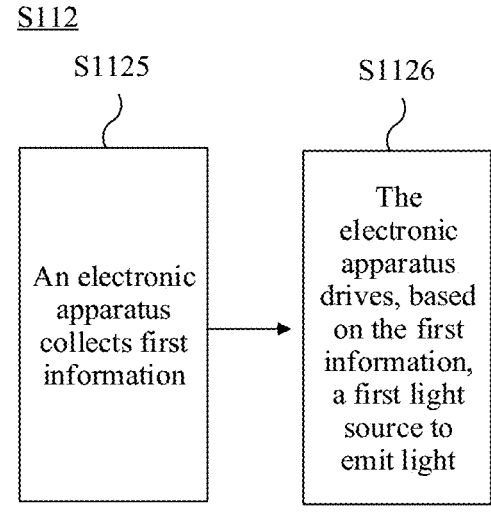
Figure 12:
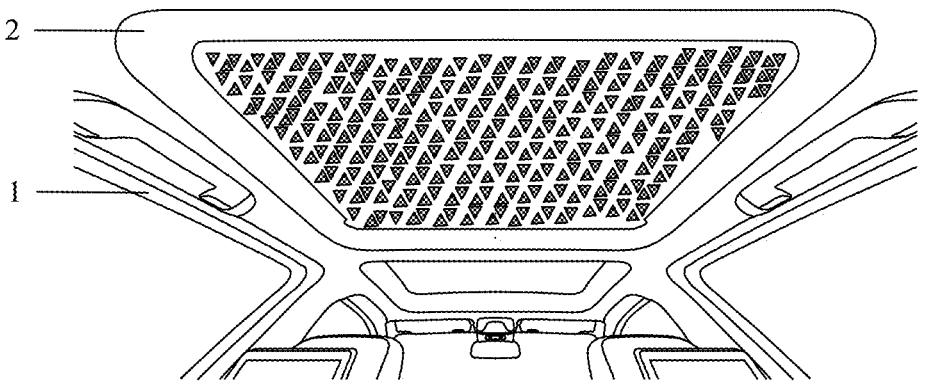
Figure 13:
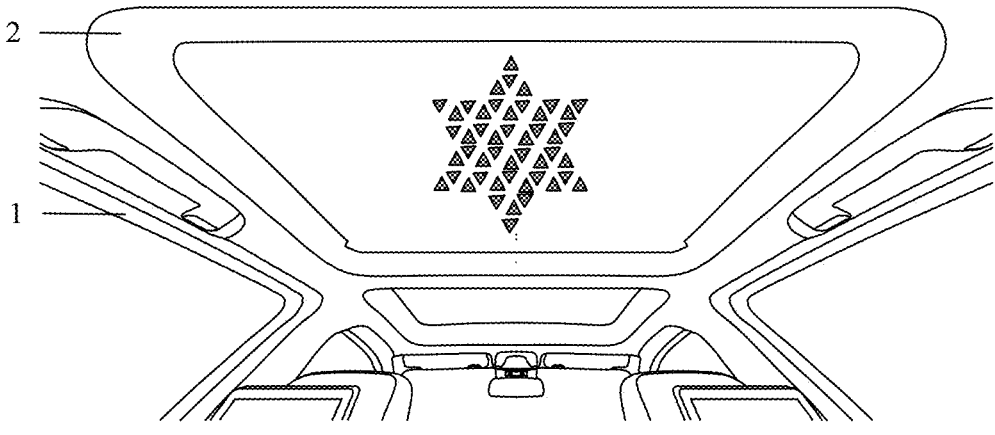

(1) in FIG. 5 is a schematic diagram of a structure of a light emitting assembly according to an embodiment of this application;

(2) in FIG. 5 is a schematic diagram of an overall lighting effect of the light emitting assembly in (1) in FIG. 5;

(1) in FIG. 6 is a schematic diagram of a structure of a light emitting assembly according to an embodiment of this application;

(2) in FIG. 6 is a schematic diagram of a partial lighting effect of the light emitting assembly in (1) in FIG. 6;

(1) in FIG. 7 is a schematic diagram of a structure of a light emitting assembly according to an embodiment of this application;

(2) in FIG. 7 is a schematic diagram of a partial lighting effect of the light emitting assembly in (1) in FIG. 7;

FIG. 8 is a schematic diagram of a structure of another light emitting assembly according to an embodiment of this application;

(1) in FIG. 9 is a schematic diagram of a structure of a light emitting assembly according to an embodiment of this application;

(2) in FIG. 9 is a schematic diagram of a partial lighting effect of the light emitting assembly in (1) in FIG. 9;

FIG. 10 is a principle block diagram of an electronic apparatus according to an embodiment of this application;

FIG. 11A is a schematic flowchart of a method for controlling a light emitting assembly according to an embodiment of this application;

FIG. 11B is a schematic flowchart of a method for controlling a light emitting assembly according to an embodiment of this application;

FIG. 11C is a schematic flowchart of a method for controlling a light emitting assembly according to an embodiment of this application;

FIG. 11D is a schematic flowchart of a method for controlling a light emitting assembly according to an embodiment of this application;

FIG. 11E is a schematic flowchart of a method for controlling a light emitting assembly according to an embodiment of this application;

FIG. 12 is a schematic diagram of effect of forming a light emitting image on an electronic apparatus according to an embodiment of this application; and FIG. 13 is a schematic diagram of effect of forming a light emitting image on an electronic apparatus according to an embodiment of this application.

DESCRIPTION OF EMBODIMENTS

In the descriptions of embodiments of this application, "/" means "or" unless otherwise specified. For example, A/B may represent A or B. In this specification, "and/or" describes only an association relationship between associated objects and represents that three relationships may exist. For example, A and/or B may represent the following three cases. Only A exists, both A and B exist, and only B exists.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the description of embodiments of this application, unless otherwise specified, "a plurality of" means two or more than two.

In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Specifically, use of the word "example", "for example", or the like is intended to present a related concept in a specific manner.

Figure 1:
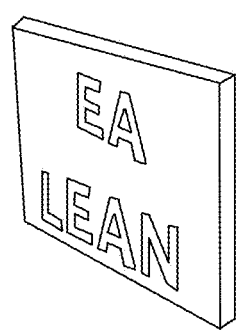
FIG. 1 is a schematic diagram of a structure of a light emitting assembly.

Currently, a light emitting assembly can present a light emitting image, to meet visual experience of a user. A specific implementation principle is as follows: Laser engraving texture shown in FIG. 1 is usually formed inside glass in a laser engraving manner, and lighting is performed on a side of the glass, to retain light at the laser engraving texture by using a light guide feature of the glass, so that a light emitting image is formed on the glass. However, the laser engraving texture formed inside the glass is monotonous, leading to a monotonous light emitting image presented by the light emitting assembly.

Figure 2:
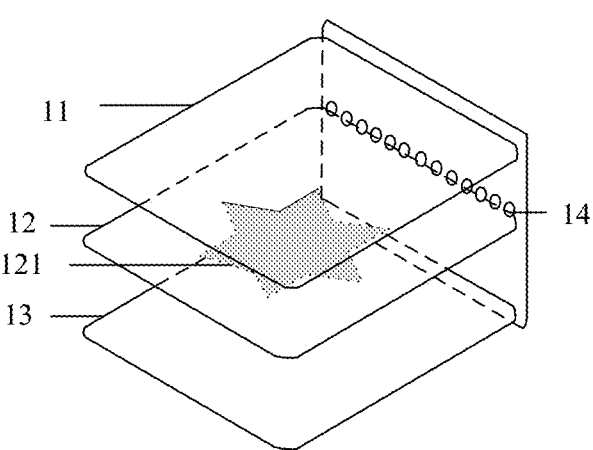
FIG. 2 is a schematic diagram of a structure of a light emitting assembly according to an embodiment of this application.

To resolve the foregoing technical problem, as shown in FIG. 2, an embodiment of this application provides a schematic diagram of a structure of a light emitting assembly 100. The light emitting assembly 100 may include a first light transmission layer 11, a second light transmission layer 13, and a first light adjustment layer 12. The first light transmission layer 11, the second light transmission layer 13, and the first light adjustment layer 12 are stacked, and the first light adjustment layer 12 is disposed between the first light transmission layer 11 and the second light transmission layer 13. The first light transmission layer 11 and the second light transmission layer 13 may be made of a glass material, or may be made of another transparent material like acrylic. This is not specifically limited in embodiments of this application. The first light adjustment layer 12 may be understood as being in a fully transparent state. A first element group 121 is disposed at the first light adjustment layer 12, the first element group 121 may include at least one first element, and transparency of the at least one first element is adjustable. In this way, transparency at a location of the at least one first element at the first light adjustment layer 12 is adjustable. The light emitting assembly may further include a first light source 14, and the first light source 14 is located on a side of the first light adjustment layer. Light emitted by the first light source 14 is irradiated on the at least one first element. The at least one first element may emit the light emitted by the first light source 14 to a side that is outside the second light transmission layer and that is away from the first light adjustment layer.

Figure 3:
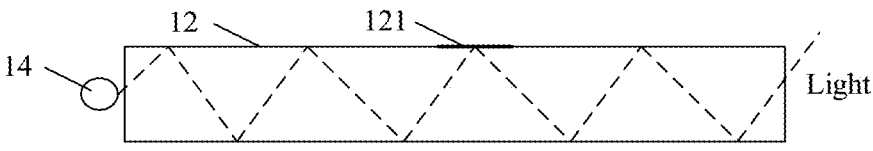
FIG. 3 is a schematic diagram of a principle of a fully transparent light adjustment layer in a light emitting assembly with light irradiation.
Figure 4:
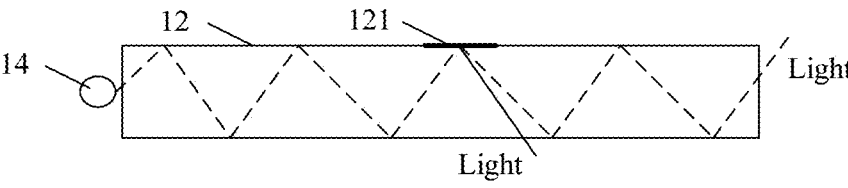
FIG. 4 is a schematic diagram of a principle of a non-fully transparent light adjustment layer in a light emitting assembly with light irradiation.

A specific principle is as follows: If the at least one first element in the first element group is completely transparent, as shown in FIG. 3, when the light emitted by the first light source 14 is emitted to the first element, the light emitted by the first light source 14 is emitted through the first element to a side that is outside the first light transmission layer and that is away from the first light adjustment layer. If the at least one first element in the first element group is not completely transparent, as shown in FIG. 4, when the light emitted by the first light source 14 is emitted to the at least one first element, the at least one first element may emit the light emitted by the first light source 14 to a side that is outside the second light transmission layer and that is away from the first light adjustment layer, to present a light emitting image.

For example, the first element group includes A first elements, and A is a positive integer greater than 2. When the light emitted by the first light source 14 is irradiated on n first elements, transparency of the n first elements is a first threshold, and the n first elements emit the light emitted by the first light source 14 to the side that is outside the second light transmission layer and that is away from the first light adjustment layer, to form a first light emitting image, where n is a positive integer less than A and greater than 1. For example, as shown in (1) in FIG. 5, the first elements in the first element group 121 are arranged into a six-pointed star image. If transparency of all the first elements is the first threshold, that is, all the first elements are not completely transparent, when the light emitted by the first light source 14 is emitted to all the first elements, these first elements emit the light emitted by the first light source 14 to the side that is outside the second light transmission layer and that is away from the first light adjustment layer, to present a six-pointed star light emitting image as shown in (2) in FIG. 5.

For example, the first element group includes A first elements, and A is a positive integer greater than 2. When the light emitted by the first light source 14 is irradiated on m first elements, transparency of the m first elements is a second threshold, and the m first elements emit the light emitted by the first light source 14 to the side that is outside the second light transmission layer and that is away from the first light adjustment layer, to form a second reflective image, where m is a positive integer less than A and greater than 1, and the second threshold is different from the first threshold. For example, as shown in (1) in FIG. 6, the first elements in the first element group 121 are arranged into a six-pointed star image. It is assumed that the six-pointed star image is divided into two parts. The first part is six corners of the six-pointed star image, and the second part is a part other than the six corners in the six-pointed star image. If first elements corresponding to the first part are completely transparent, and transparency of first elements corresponding to the second part is the second threshold, that is, the first elements are not completely transparent, when the light emitted by the first light source 14 is emitted to the first elements corresponding to the second part, these first elements emit the light emitted by the first light source 14 to the side that is outside the second light transmission layer and that is away from the first light adjustment layer, to present a hexagonal light emitting image shown in (2) in FIG. 6.

In conclusion, in an embodiment of this application, the transparency of the at least one first element in the first element group is adjusted, and light is irradiated on these first elements, so that a plurality of light emitting images can be presented.

In an embodiment of this application, a material of the first elements in the first element group 121 may be a polymer dispersed liquid crystal (PDLC). Certainly, in embodiments of this application, the material of the first element is not limited to the polymer dispersed liquid crystal, and may alternatively be another material, for example, an ethylene carbonate (EC) material or a suspended particle device (SPD) material. A common feature of these materials is that transparency can be adjusted by adjusting a voltage. In an embodiment of this application, an example in which the material of the first element is PDLC is used for description.

In an embodiment of this application, there are a plurality of first elements in the first element group, and transparency adjustment may be performed on the plurality of first elements in the following manners: Manner 1: Transparency adjustment may be performed on the plurality of first elements as a whole. Specifically, a first electrode is disposed at a first end of the first element group 121 of the first light adjustment layer 12, and a second electrode is disposed at a second end of the first element group 121. One of the first electrode and the second electrode is a com electrode. In this way, the electrode can cover a plurality of first elements in the first element group 121, and transparency adjustment can be performed on the plurality of covered first elements as a whole. Manner 2: Transparency of first elements in the plurality of first elements may be independently adjusted. Specifically, each first element in the first element group 121 is an independent element, a first electrode is disposed at a first end of each first element in the first element group 121 of the first light adjustment layer 12, and a second electrode is disposed at a second end of the first element. In this way, each electrode can cover one first element, and a voltage of each first element can be separately adjusted, so that transparency of the first elements is independently adjusted.

For example, transparency of the first elements in the plurality of first elements may be independently adjusted. As shown in (1) in FIG. 7, the first elements in the first element group 121 are arranged in an array at the first light adjustment layer 12. If all the first elements are not completely transparent, when the light emitted by the first light source 14 is emitted to all the first elements, these first elements emit the light emitted by the first light source 14 to the side that is outside the second light transmission layer and that is away from the first light adjustment layer, to present a light emitting image shown in (2) in FIG. 7. Similarly, when the light emitted by the first light source 14 is emitted to first elements of different combinations, these first elements emit the light emitted by the first light source 14 to the side that is outside the second light transmission layer and that is away from the first light adjustment layer, to present different light emitting images. In this way, when the transparency of the first elements in the first element group 121 changes independently, the light emitted by the first light source 14 is irradiated on different first elements, to present different light emitting images. Therefore, more light emitting images can be presented, and the presented light emitting images can better meet a user requirement, so that visual experience of a user is richer.

In a specific implementation, the transparency of the first elements in the plurality of first elements is independently adjusted. In this case, transparency of these first elements may be synchronously adjusted, or may be asynchronously adjusted. Synchronous transparency adjusting may be understood as that paces for adjusting transparency of a plurality of first elements are consistent. For example, at a same moment, adjusted transparency of the plurality of first elements is the same. Asynchronous transparency adjusting may be understood as that paces for adjusting transparency of a plurality of first elements are not consistent. For example, at a same moment, transparency of a first part of first elements in the plurality of first elements is a first value, transparency of a second part of first elements in the plurality of first elements is a second value, the second value is different from the first value, and the second part of first elements is different from the first part of first elements.

In embodiments of this application, the first elements in the first element group 121 may be arranged in different manners at the first light adjustment layer 12. For example, if a quantity of first elements in the first element group 121 is greater than or equal to 3, the first elements in the first element group 121 may be arranged into a preset image, for example, a triangle, a five-pointed star, a hexagon, a text image, or the like, at the first light adjustment layer 12. Certainly, if there are a plurality of first elements in the first element group 121, the first elements in the first element group 121 may be arranged in an array at the first light adjustment layer 12. For example, the first elements in the first element group 121 are evenly distributed at the first light adjustment layer 12 based on a preset spacing.

It should be noted that shapes of the first elements in the first element group 121 may be the same or may be different. In addition, the first element may be in any shape. This is not specifically limited in embodiments of this application.

In this embodiment of this application, the first light source 14 may be in two states: an emitting state and a non-emitting state. When the first light source 14 is in the emitting state, and the first elements in the first element group are in the completely transparent state, the light emitting assembly may be used as common glass. When the first light source 14 is in the emitting state, and the first elements in the first element group are in an incompletely transparent state, the light emitting assembly may be used as light shielding glass. When the first light source 14 is in the non-emitting state, and the first elements in the first element group are in the completely transparent state, the light emitting assembly may be used as common glass. When the first light source 14 is in the non-emitting state, and the first elements in the first element group are in the incompletely transparent state, the light emitting assembly, as a light emitting assembly, may present different light emitting images. That the first element is in the incompletely transparent state may be understood as that the first element is opaque or semi-transparent, that is, transparency of the first element is between a minimum value and a maximum value.

In some embodiments, to control the first light source 14 to emit light, the light emitting assembly 100 provided in this embodiment of this application may further include a light emitting circuit. The light emitting circuit is disposed on the light emitting assembly 100, and the light emitting circuit is configured to control the first light source 14 to emit light. Specifically, the first light source 14 may include a plurality of LED lights arranged on at least one end side of the light emitting assembly 100. For example, the plurality of LED lights are arranged on a first end side of the first light adjustment layer 12. Alternatively, the plurality of LED lights are arranged on a first end side and a second end side of the first light adjustment layer 12, and the first end side and the second end side are opposite to each other. Alternatively, the plurality of LED lights are arranged on a first end side of the first light adjustment layer 12 and a first end side of a second light adjustment layer 15, and the first end side of the first light adjustment layer 12 and the first end side of the second light adjustment layer 15 are a same side of the light emitting assembly 100. Specifically, in order to present different light emitting images, the light emitting circuit is further configured to control at least one LED light in the plurality of LED lights to emit light. To present light emitting images with different luminance and different colors, the light emitting circuit is further configured to control luminance and a wavelength of the light emitted by the at least one LED light.

In some embodiments, to present more light emitting images, FIG. 8 is a schematic diagram of a structure of another light emitting assembly 100 according to an embodiment of this application. The light emitting assembly 100 may further include a second light adjustment layer 15, disposed between a first light transmission layer 11 and a second light transmission layer 13. A second element group 151 is disposed at the second light adjustment layer 15, the second element group 151 includes at least one second element, and transparency of the at least one second element is adjustable. For related explanations of the second element group 151 and the second element in the second element group 151 herein, refer to the foregoing explanations of the first element group 121 and the first element in the first element group 121. Details are not described herein again. The light emitting assembly 100 may further include a second light source 17, and the second light source 17 is located on a side of the second light adjustment layer 15. The at least one second element may emit light emitted by the second light source 17 to a side that is outside the second light transmission layer 13 and that is away from the second light adjustment layer 15. For related explanations of the second light source 17 herein, refer to the foregoing explanations of the first light source 14. Details are not described herein again.

In a specific implementation, transparency adjustment is performed on the first elements in the first element group 121 as a whole, and transparency adjustment is performed on the second elements in the second element group 151 as a whole. In this case, as shown in (1) in FIG. 9, it is assumed that the first elements in the first element group 121 are arranged into a first preset image, and the second elements in the second element group 151 are arranged into a second preset image. When transparency of the first elements in the first element group 121 is a first threshold, and transparency of the second elements in the second element group 151 is a second threshold, light emitted by the first light source 14 is emitted to the first elements in the first element group 121, to present a first image under an action of the first elements, light emitted by the second light source 17 is emitted to the second elements in the second element group 151, to present a second image under an action of the second elements, and the first image and the second image are superimposed to form a first light emitting image shown in (2) in FIG. 9. Similarly, when the transparency of the first element group 121 is the first threshold, and the transparency of the second element group 151 is a third threshold, the first element group 121 presents the first image, the second element group 151 presents a third image, and the first image and the third image are superimposed to form a second light emitting image. Therefore, more light emitting images can be presented.

Certainly, the light emitting assembly 100 provided in embodiments of this application is not limited to including one light adjustment layer and two light adjustment layers, and may further include a plurality of light adjustment layers. For example, the light emitting assembly 100 may further include a third light adjustment layer, a fourth light adjustment layer, . . . , and an n$^{th}$ light adjustment layer. A specific implementation principle is the same as the foregoing descriptions. Examples are not enumerated one by one.

In some embodiments, to meet a requirement of a user for a light emitting image, a more precise light emitting image is obtained. The light emitting assembly 100 provided in this embodiment of this application may further include a light guide structure 16. As shown in (2) in FIG. 5, (2) in FIG. 6, (2) in FIG. 7, and (2) in FIG. 9, the light guide structure 16 is disposed at the first light adjustment layer 12. Certainly, if the light emitting assembly 100 has a plurality of light adjustment layers, the light guide structure 16 may be disposed at each light adjustment layer. The light guide structure 16 and the light adjustment layer may be a same layer, or the light guide structure 16 and the light adjustment layer may be two layers independent of each other. The light guide structure 16 is configured to transmit the light emitted by the first light source 14 to at least one element in an element group. Specifically, the light guide structure 16 may include a plurality of optical fibers. The plurality of fibers are disposed at the light adjustment layer, and are distributed between elements in the element group. For example, the plurality of optical fibers are disposed at the first light adjustment layer 12, and are distributed between the first elements in the first element group 121. Preferably, a plurality of elements in the element group are in a one-to-one correspondence with the plurality of optical fibers. For example, a plurality of first elements in the first element group 121 are in a one-to-one correspondence with the plurality of optical fibers. When each element corresponds to one optical fiber, lighting of each element may be precisely controlled, so that more light emitting images can be generated, and precision of the light emitting image can be improved. In addition, local elements can be precisely illuminated, so that the light emitting assembly 100 locally emits light.

Certainly, the light emitting assembly may alternatively be determined in other combination forms of the foregoing examples. Examples are not enumerated one by one in embodiments of this application.

Based on the structure of the light emitting assembly in the foregoing embodiment, an embodiment of this application provides a method for controlling a light emitting assembly. The method for controlling a light emitting assembly is applicable to the electronic apparatus mentioned in embodiments of this application. FIG. 10 is a schematic diagram of a structure of an electronic apparatus according to an embodiment of this application. The electronic apparatus may be a product that uses a light emitting assembly, for example, a vehicle, an automatic glass curtain, an automatic glass door, or the like. This embodiment is described by using an example in which the electronic apparatus is a vehicle.

As shown in FIG. 10, the electronic apparatus 1000 may include a light emitting assembly 100, one or more processors 110, and one or more memories 120. The light emitting assembly 100 and the memory 120 are coupled to the processor 110. The memory 120 is configured to store a computer program product. The computer program product includes computer instructions. When the processor 110 reads the computer instructions from the memory, the electronic apparatus 1000 is enabled to perform the following operations.

FIG. 11A is a schematic flowchart of a method for controlling a light emitting assembly according to an embodiment of this application. The method may include:

S110: An electronic apparatus obtains an operation 1 (for example, a first operation) of a user.

The operation 1 (the first operation) is used to indicate a first light source to emit light. In other words, the first operation is used to drive a first light source of a light emitting circuit to emit light.

The operation 1 may include a first gesture operation. For example, the first gesture operation may include a clapping operation, a finger snapping operation, a hand raising operation, and the like. For example, the first operation is a finger snapping operation. When the user performs a finger snapping action in the vehicle, the vehicle receives the finger snapping operation of the user. The first operation may alternatively be an operation performed by the user on a large cockpit screen. Certainly, the first operation may further represent a location of the user. For example, when the user sits in a seat in the vehicle, the vehicle receives an operation of the user sitting in the seat.

During specific implementation, one or more sensors may include a customer monitor system (CMS), and the system is configured to monitor a passenger gesture status. The one or more sensors may also include a driver monitor system (DMS), and the driver monitor system is configured to monitor a passenger gesture status. The one or more sensors may further include a large cockpit screen. The large cockpit screen is used to detect an operation performed by the user on the large screen, and the operation may change a status of a light emitting assembly.

S111: In response to the operation 1, the electronic apparatus adjusts transparency of at least one first element in a first element group at a first light adjustment layer of the light emitting assembly.

The light emitting assembly may include a first light transmission layer and a second light transmission layer that are stacked. The first light adjustment layer is disposed between the first light transmission layer and the second light transmission layer, the first element group is disposed at the first light adjustment layer, the first element group includes the at least one first element, and transparency of the at least one first element is adjustable. The light emitting assembly may further include a first light source, and the first light source is located on a side of the first light adjustment layer. The at least one first element is capable of emitting light emitted by the first light source to a side that is outside the second light transmission layer and that is away from the first light adjustment layer. Specifically, for specific descriptions of the light emitting assembly, refer to the foregoing embodiment. Details are not described herein again.

In a specific implementation, a material of first elements in the first element group may be a PDLC, EC, or an SPD. The electronic apparatus may adjust the transparency of the first element by adjusting a voltage of the first elements in the first element group.

Transparency adjustment is performed on the first elements in the first element group as a whole, and the electronic apparatus adjusts a voltage of the first element group to adjust transparency of the first element group, that is, transparency of the first elements in the first element group. The transparency of the first elements in the first element group is independently adjusted, and the electronic apparatus adjusts the voltage of the first elements in the first element group to adjust the transparency of the element.

The first elements in the first element group are arranged in the following manners. The first elements in the first element group are arranged into a preset image at the first light adjustment layer, or the first elements in the first element group are arranged in an array at the first light adjustment layer. Specifically, when the transparency of the first elements in the first element group is independently adjusted, the first elements in the first element group are arranged in an array at the first light adjustment layer.

S112: The electronic apparatus controls the first light source of the light emitting assembly to emit light.

Specifically, the electronic apparatus controls the light emitted by the first light source of the light emitting assembly to be irradiated on the at least one first element.

The at least one first element is configured to emit light to a side that is outside the second light transmission layer of the light emitting assembly and that is away from the first light adjustment layer, to present different light emitting images.

For example, it is assumed that a value range of transparency is 0 to 100. The transparency 0 indicates opaque. The transparency 100 indicates fully transparent. In this case, a first threshold may be any value less than 60. Therefore, that first transparency of the at least one first element reaches the first threshold may be understood as that the first element is in an incompletely transparent state.

The electronic apparatus controls the light emitted by the first light source to be irradiated on the at least one first element, where the at least one first element is in the incompletely transparent state, and the at least one first element reflects or refracts the light from the first light source to form a plurality of different light emitting images.

For example, the electronic apparatus is a vehicle 1. As shown in FIG. 12, a sunroof 2 of the vehicle 1 is the light emitting assembly provided in embodiments of this application. When the transparency of the first elements in the first element group reaches the first threshold, a processor in the vehicle 1 controls the light emitted by the first light source to be irradiated on all first elements in the first element group at the first light adjustment layer of the light emitting assembly, and the first elements in the first element group refract or reflect the light emitted by the first light source, and emits the light to the side that is outside the second light transmission layer of the light emitting assembly and that is away from the first light adjustment layer, to form a light emitting image shown in FIG. 12. When transparency of the at least one first element in the first element group reaches the first threshold, the processor in the vehicle 1 controls the light emitted by the first light source to be irradiated on the at least one first element, and the at least one first element refracts or reflects the light emitted by the first light source, and emits the light to the side that is outside the second light transmission layer of the light emitting assembly and that is away from the first light adjustment layer, to form a light emitting image shown in FIG. 13.

In some embodiments, to present more light emitting images, the light emitting assembly provided in this embodiment of this application may further include a second light adjustment layer. The second light adjustment layer is disposed between the first light transmission layer and the second light transmission layer, a second element group is disposed at the second light adjustment layer, the second element group includes at least one second element, and transparency of the at least one second element is adjustable. For descriptions of the second light adjustment layer, refer to the descriptions of the first light adjustment layer in the foregoing embodiments. Details are not described herein again. The light emitting assembly may further include a second light source, and the second light source is located on a side of the second light adjustment layer. The at least one second element is capable of emitting light emitted by the second light source to a side that is outside the second light transmission layer and that is away from the second light adjustment layer. For related explanations of the second light source herein, refer to the foregoing explanations of the first light source. Details are not described herein again.

S110 to S112 may be specifically implemented as follows: When the electronic apparatus receives the first operation of the user, the electronic apparatus adjusts, in response to the first operation, the transparency of the at least one first element in the first element group at the first light adjustment layer of the light emitting assembly, and controls the first light source of the light emitting assembly to emit light. For example, the operation 1 is a finger snapping operation, and the electronic apparatus is a vehicle. When the user performs a finger snapping action in the vehicle, the vehicle receives the finger snapping operation of the user. In response to the operation, the vehicle drives the light adjustment layer to adjust transparency, and drives the first light source to emit light. In this way, the light emitted by the first light source is irradiated on the light adjustment layer in the sunroof glass of the vehicle, and the light adjustment layer reflects or refracts the light emitted by the first light source in the vehicle, to illuminate space in the vehicle.

During specific implementation, the one or more processors include a cockpit domain controller (CDC). The cockpit domain controller is configured to collect information about a cockpit domain subsystem or a related sensor, and transfer corresponding control information to a light emitting assembly driver after logic processing of the information. The light emitting assembly driver is configured to: receive a trigger signal from the CDC, convert an analog signal, drive the light adjustment layer to adjust transparency, and drive the first light source (for example, an LED) to adjust light emitting luminance and a light emitting color or a light emitting position separately.

FIG. 11B is a schematic flowchart of a method for controlling a light emitting assembly according to an embodiment of this application. The method further includes: S113: Obtain an operation 2 (for example, the fourth operation) of the user.

The operation 2 (the fourth operation) may include a gesture operation, a button operation, a voice operation, and the like. For example, the gesture operation may include a finger snapping operation, a finger movement operation, and the like. This is not specifically limited in this embodiment of this application.

Certainly, the operation 2 may alternatively be the same as the operation 1. Details are not described herein again.

S114: In response to the operation 2, the electronic apparatus adjusts the transparency of the at least one second element in the second element group at the second light adjustment layer of the light emitting assembly.

Specifically, the electronic apparatus adjusts the transparency of the at least one second element. For a specific implementation, refer to the specific implementation of S111. Details are not described herein again.

S115: The electronic apparatus controls the second light source of the light emitting assembly to emit light.

Specifically, the electronic apparatus controls the light emitted by the second light source of the light emitting assembly to be irradiated on the at least one second element.

In a specific implementation, a material of second elements in the second element group may be a PDLC, EC, or an SPD. The electronic apparatus may adjust the transparency of the second element by adjusting a voltage of the second elements in the second element group.

Transparency adjustment is performed on the second elements in the second element group as a whole, and the electronic apparatus adjusts a voltage of the second element group to adjust transparency of the second element group, that is, transparency of the second elements in the second element group. The transparency of the second elements in the second element group is independently adjusted, and the electronic apparatus adjusts the voltage of the second elements in the second element group to adjust the transparency of the element.

When the first transparency of the at least one first element reaches a second threshold, and second transparency of the at least one second element reaches a third threshold, the electronic apparatus controls the light emitted by the first light source to still be irradiated on the at least one second element in the second element group, and reflects or refracts the light by using a combination of the at least one first element and the at least one second element to present different light emitting images.

For example, it is assumed that a value range of transparency is 0 to 100. The transparency 0 indicates opaque. The transparency 100 indicates fully transparent. In this case, the second threshold may be any value less than 50. Therefore, that the second transparency of the at least one second element reaches the second threshold may be understood as that the second element is in an incompletely transparent state.

The electronic apparatus controls the light emitted by the first light source to be irradiated on the at least one first element and the at least one second element, where the at least one first element and the at least one second element are in the incompletely transparent state, and the at least one first element and the at least one second element reflect or refract the light from the first light source to form a plurality of different light emitting images.

For example, it is assumed that the first elements in the first element group are arranged into a first preset image, and the second elements in the second element group are arranged into a second preset image. When the first transparency of the at least one first element in the first element group is the first threshold, and the second transparency of the at least one second element in the second element group is the second threshold, the electronic apparatus controls the light emitted by the first light source to be irradiated on the at least one first element and the at least one second element, the at least one first element presents a first image, the at least one second element presents a second image, and the first image and the second image are superimposed to form a first light emitting image. Similarly, when the first transparency of the at least one first element in the first element group is the first threshold, and the second transparency of the at least one second element in the second element group is the third threshold, the electronic apparatus controls the light emitted by the first light source to be irradiated on the at least one first element and the at least one second element, the at least one first element presents the first image, the at least one second element presents a third image, and the first image and the third image are superimposed to form a second light emitting image. Therefore, more light emitting images can be presented.

In some embodiments, the light emitting assembly provided in this embodiment of this application may further include a light emitting circuit. The light emitting circuit is disposed on the light emitting assembly, and the light emitting circuit is configured to control the first light source to emit light. For details, refer to the related descriptions in the foregoing embodiment. Details are not described herein again.

In some embodiments, as shown in FIG. 10, the electronic apparatus 1000 further includes one or more sensors 130, and the sensor 130 is coupled to the processor 110. FIG. 11C is a schematic flowchart of a method for controlling a light emitting assembly according to an embodiment of this application. As shown in FIG. 11C, to achieve an objective of energy saving, some space may be illuminated based on a user requirement. S112 may be specifically:

S1120: The electronic apparatus obtains an operation 3 (for example, the second operation) of the user.

The operation 3 may be the same as the operation 1. Details are not described herein again.

S1121: In response to the operation 3, the electronic apparatus determines a first position that is on the light emitting assembly and that corresponds to the user or a first body part of the user.

The first body part of the user may be a hand, a leg, a body, or the like of the user.

The foregoing example is still used. When the user performs a finger snapping action in the vehicle, the vehicle receives the finger snapping operation of the user. In addition, the vehicle determines a spatial location of a finger of the user. The vehicle determines, based on the spatial location and a preset correspondence between the spatial location and each element in the sunroof glass, a first location of the sunroof glass corresponding to the finger of the user, and a plurality of elements in the first location. Specifically, when detecting a finger snapping action, the CMS detects a location of the finger of the user in real time, locates spatial coordinates (X, Y, Z) of the finger, and directly maps the spatial coordinates to coordinates (x, y) of a plurality of elements of a sunroof glass plane of the vehicle.

S1122: The electronic apparatus drives, based on the first position, the first light source to emit light to be irradiated on the plurality of elements located in the first position.

The foregoing example is still used. After the first location of the sunroof glass corresponding to the finger of the user and the plurality of elements in the first location are determined, in response to the operation, the vehicle drives the first light source to emit light to be irradiated on the plurality of elements. In this way, the plurality of elements reflect or refract the light emitted by the first light source in the vehicle, to illuminate space in which the user or the finger of the user is located in the vehicle, so as to illuminate local space.

Similarly, as the first body part of the user moves, an element that needs to be illuminated in the sunroof glass changes with a spatial location of the first body part. For example, the CMS continues to detect an image status of the finger. If luminance becomes higher, it indicates that illumination succeeds. If the luminance does not become higher or the finger moves, the CMS continues to transfer current spatial coordinates of the finger, and converts the current spatial coordinates into planar coordinates of the sunroof glass of the vehicle. In this way, illuminated space in the vehicle moves with movement of the first body part of the user, so that real-time light tracking of movement of the first body part can be implemented, and precise light tracking is performed in a specific range on an action like reading, using a mobile phone, and taking an item in the vehicle at night, thereby achieving a light tracking effect.

To enrich luminance and colors of a light emitting image, FIG. 11D is a schematic flowchart of a method for controlling a light emitting assembly according to an embodiment of this application. As shown in FIG. 11D, S112 may further be specifically:

S112 may further be:

S1123: The electronic apparatus receives an operation 4 (for example, the third operation) of the user.

The operation 4 is used to indicate luminance and a wavelength of the light emitted by the first light source. In other words, the operation 4 is used to drive luminance and a wavelength of the light emitted by the first light source of the light emitting circuit.

The operation 4 may include a second gesture operation. For example, the second gesture operation may include a rotation operation, a sliding operation, and the like. For example, the second operation is a rotation operation. When the user raises a thumb in the vehicle and rotates the thumb clockwise, the vehicle receives the operation of the user. For example, the second operation is a sliding operation. When the user stretches out an index finger in the vehicle and slides the index finger in a direction from the bottom to the top of the vehicle, the vehicle receives the operation of the user.

S1124: In response to the operation 4, the electronic apparatus adjusts the luminance and the wavelength of the light emitted by the first light source.

The foregoing example is still used. When the user raises the thumb in the vehicle and rotates the thumb clockwise (or counterclockwise), the vehicle receives the operation of the user. In response to the operation, the vehicle increases (or decreases) the luminance of the light emitted by the first light source, and after the thumb action is canceled, exits luminance adjustment of light. When the user stretches out the index finger in the vehicle and slides the index finger in the direction from the bottom to the top of the vehicle (or in a direction from the top to the bottom of the vehicle), the vehicle receives the operation of the user. In response to the operation, the vehicle increases (or decreases) the wavelength of the light emitted by the first light source. Certainly, when the user raises the thumb in the vehicle and rotates the thumb clockwise (or counterclockwise), the vehicle receives the operation of the user. In response to the operation, the vehicle increases (or decreases) the wavelength of the light emitted by the first light source. When the user stretches out the index finger in the vehicle and slides the index finger in the direction from the bottom to the top of the vehicle (or in a direction from the top to the bottom of the vehicle), the vehicle receives the operation of the user. In response to the operation, the vehicle increases (or decreases) the luminance of the light emitted by the first light source. This may be specifically set based on an actual situation. This is not specifically limited in embodiments of this application.

In some embodiments, the first light source may include a plurality of LED lights. The plurality of LED lights are arranged on at least one end side of the light emitting assembly. S1124 may be specifically: In response to the operation 4, the electronic apparatus adjusts luminance and a wavelength of light emitted by at least one LED light in the plurality of LED lights.

To make a light emitting image more occasional, FIG. 11E is a schematic flowchart of a method for controlling a light emitting assembly according to an embodiment of this application. As shown in FIG. 11E, S112 may further be specifically:

S1125: The electronic apparatus collects first information.

The first information represents information about an environment and/or the electronic apparatus. The environment may be weather, a location, a time, or the like. The information about the electronic apparatus may be information that changes the information about the electronic apparatus. For example, the electronic apparatus is a vehicle, and the information about the electronic apparatus may include a quantity of persons in the vehicle, an age range of the persons, and the like.

During specific implementation, the one or more sensors may include a seat sensor and/or a rain light sensor. The seat sensor is configured to sense whether a seat is empty. The rain light sensor is configured to sense an environment status outside the vehicle, for example, sunlight luminance and rainfall.

S1126: The electronic apparatus drives, based on the first information, the first light source to emit light.

During specific implementation, the one or more processors include a body control module (BCM). The body control module is configured to collect sensor information (that is, the first information) of a related body part, and transfer corresponding control information to the light emitting assembly driver after logic processing of the information. The light emitting assembly driver is configured to: receive a trigger signal from the CDC and the BCM, convert an analog signal, drive the light adjustment layer to adjust transparency, and drive the first light source (for example, an LED) to adjust light emitting luminance and a light emitting color or a light emitting position separately. For example, the vehicle obtains an environment status (for example, rainy weather) based on the BCM, and transfers corresponding control information to the light emitting assembly driver. The light emitting assembly driver separately adjusts transparency, light emitting luminance, a light emitting color, or a light emitting position based on the control information, and the sunroof glass of the vehicle may present a raindrop ripple effect. Similarly, the sunroof glass of the vehicle may alternatively present a fantasy effect, a starry-sky effect, and the like.

In some embodiments, to meet a requirement of a user for a light emitting image, a more precise light emitting image is obtained. The light emitting assembly provided in this embodiment of this application may further include a light guide structure. The light guide structure is disposed at the first light adjustment layer. Certainly, if the light emitting assembly has a plurality of light adjustment layers, the light guide structure may be disposed at each light adjustment layer. The light guide structure and the light adjustment layer may be a same layer, or the light guide structure and the light adjustment layer may be two layers independent of each other. The light guide structure is configured to transmit the light emitted by the light source to at least one element in an element group. Specifically, the light guide structure may include a plurality of optical fibers. The plurality of fibers are disposed at the light adjustment layer, and are distributed between elements in the element group. For example, the plurality of optical fibers are disposed at the first light adjustment layer, and are distributed between the first elements in the first element group. Preferably, a plurality of elements in the element group are in a one-to-one correspondence with the plurality of optical fibers. For example, a plurality of first elements in the first element group are in a one-to-one correspondence with the plurality of optical fibers. When each element corresponds to one optical fiber, lighting of each element may be precisely controlled, so that more light emitting images can be generated, and precision of the light emitting image can be improved. In addition, local elements can be precisely illuminated, so that the light emitting assembly locally emits light.

An embodiment of this application further provides a vehicle. The vehicle has a function of implementing behavior of the electronic apparatus in any method in the foregoing embodiments. Alternatively, the vehicle includes the light emitting assembly in the foregoing embodiments.

An embodiment of this application further provides a chip system. The chip system includes at least one processor and at least one interface circuit. The processor and the interface circuit may be interconnected by using a line. For example, the interface circuit may be configured to receive a signal from another apparatus (for example, a memory). For another example, the interface circuit may be configured to send a signal to another apparatus (for example, the processor). For example, the interface circuit may read instructions stored in the memory, and send the instructions to the processor. When the instructions are executed by the processor, an electronic apparatus may be enabled to perform the steps performed by the electronic apparatus in the foregoing embodiments. Certainly, the chip system may further include another discrete device. This is not specifically limited in this embodiment of this application.

An embodiment of this application further provides an apparatus. The apparatus is included in an electronic apparatus. The apparatus has a function of implementing behavior of the electronic apparatus in any method in the foregoing embodiments. The function may be implemented by hardware, or may be implemented by hardware executing corresponding software. The hardware or the software includes at least one module or unit corresponding to the foregoing function, for example, a detection module or unit, and a determining module or unit.

An embodiment of this application further provides a computer-readable storage medium, including computer instructions. When the computer instructions are run on an electronic apparatus, the electronic apparatus is enabled to perform any method in the foregoing embodiments.

An embodiment of this application further provides a computer program product. When the computer program product runs on a computer, the computer is enabled to perform any method in the foregoing embodiments.

To implement the foregoing functions, the terminal and the like include corresponding hardware structures and/or software modules for performing the functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the terminal may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software function module. It should be noted that, in embodiments of this application, module division is an example, and is merely logical function division. In an actual implementation, another division manner may be used.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented based on a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Functional units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in embodiments of this application. The foregoing storage medium includes any medium that can store a program product, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A light emitting assembly, comprising:
a first light transmission layer and a second light transmission layer that are stacked;
a first light adjustment layer, disposed between the first light transmission layer and the second light transmission layer, wherein a first element group is disposed at the first light adjustment layer, the first element group comprises at least one first element, and transparency of the at least one first element is adjustable;
a light guide structure comprising a plurality of optical fibers disposed at the first light adjustment layer, and distributed between the at least one first element in the first element group, wherein a plurality of first elements in the first element group are in a one-to-one correspondence with the plurality of optical fibers; and
a first light source, wherein the first light source is located on a side of the first light adjustment layer, wherein the at least one first element is capable of emitting light emitted from the first light source to a side outside the second light transmission layer and away from the first light adjustment layer.

2. The light emitting assembly according to claim 1, wherein the light emitting assembly further comprises:
a second light adjustment layer, disposed between the first light transmission layer and the second light transmission layer, wherein a second element group is disposed at the second light adjustment layer, the second element group comprises at least one second element, and transparency of the at least one second element is adjustable; and
a second light source, wherein the second light source is located on a side of the second light adjustment layer, wherein
the at least one second element is capable of emitting light emitted by the second light source to a side outside the second light transmission layer away from the second light adjustment layer.

3. The light emitting assembly according to claim 1, wherein transparency of at least one first element in the first element group is independently adjustable, and the first elements in the first element group are arranged in an array at the first light adjustment layer.

4. The light emitting assembly according to claim 1, wherein
the first light source comprises at least one light emitting diode (LED) light, and the at least one LED light is arranged on at least one side of the light emitting assembly; and
the light emitting assembly further comprises:
a light emitting circuit, configured to control the at least one LED light to emit light.

5. The light emitting assembly according to claim 4, wherein the light emitting circuit is further configured to control luminance and a wavelength of the light emitted by the at least one LED light.

6. The light emitting assembly according to claim 1, wherein the
light guide structure is disposed at the first light adjustment layer
and is configured to transmit light from the first light source to the at least one first element.

7. A method for controlling a light emitting assembly, the method comprising:
detecting a first operation of a user;
adjusting, in response to the first operation, transparency of at least one first element in a first element group at a first light adjustment layer of the light emitting assembly, wherein the light emitting assembly comprises a first light transmission layer and a second light transmission layer that are stacked, wherein the first light adjustment layer is disposed between the first light transmission layer and the second light transmission layer, wherein the first element group is disposed at the first light adjustment layer, and wherein transparency of the at least one first element is adjustable, and wherein the light emitting assembly further comprises a light guide structure comprising a plurality of optical fibers disposed at the first light adjustment layer, and distributed between the at least one first element in the first element group, wherein a plurality of first elements in the first element group are in a one-to-one correspondence with the plurality of optical fibers; and
controlling a first light source of the light emitting assembly to emit light, wherein the first light source is located on a side of the first light adjustment layer, and wherein the at least one first element is capable of emitting light emitted from the first light source to a side outside the second light transmission layer and away from the first light adjustment layer.

8. The method according to claim 7, wherein the controlling the first light source of the light emitting assembly to emit light comprises:
obtaining a second operation of the user;

determining, in response to the second operation, a first position on the light emitting assembly and corresponds to the user or a first body part of the user; and driving, based on the first position, the light emitted by the first light source to be irradiated on one or more elements located in the first position.

9. The method according to claim 7, wherein the controlling the first light source of the light emitting assembly to emit light comprises:

obtaining a third operation of the user; and adjusting, in response to the third operation, luminance and a wavelength of the light emitted by the first light source.

10. The method according to claim 9, wherein the first light source comprises at least one light emitting diode (LED) light, and the adjusting, in response to the third operation, luminance and a wavelength of the light emitted by the first light source comprises:

adjusting, in response to the third operation, luminance and a wavelength of light emitted by the at least one LED light.

11. The method according to claim 7, wherein the controlling the first light source of the light emitting assembly to emit light comprises:

collecting first information, wherein the first information represents information about an environment or an electronic apparatus; and driving, based on the first information, the first light source to emit light.

12. The method according to claim 7, wherein the light emitting assembly further comprises:

a second light adjustment layer, disposed between the first light transmission layer and the second light transmission layer, wherein a second element group is disposed at the second light adjustment layer, the second element group comprises at least one second element, and transparency of the at least one second element is adjustable; and a second light source, wherein the second light source is located on a side of the second light adjustment layer, wherein the at least one second element is capable of emitting light emitted by the second light source to a side outside the second light transmission layer away from the second light adjustment layer; and the method further comprises:

obtaining a fourth operation of the user;

adjusting, in response to the fourth operation, transparency of the at least one second element in the second element group at the second light adjustment layer of the light emitting assembly; and controlling the second light source of the light emitting assembly to emit light.

13. The method according to claim 7, wherein transparency of first elements in the first element group is independently adjustable, and the at least one first element in the first element group are arranged in an array at the first light adjustment layer.

14. The method according to claim 7, wherein the first light source comprises at least one LED light, and the at least one LED light is arranged on at least one side of the light emitting assembly; and the light emitting assembly further comprises:

a light emitting circuit, configured to control at least one LED light to emit light.

15. The method according to claim 7, wherein the light guide structure is disposed at the first light adjustment layer and is configured to transmit, to the at least one first element, the light emitted by the first light source.

16. A vehicle, wherein the vehicle comprises a light emitting assembly, wherein the light emitting assembly comprises:

a first light transmission layer and a second light transmission layer that are stacked; a first light adjustment layer, disposed between the first light transmission layer and the second light transmission layer, wherein a first element group is disposed at the first light adjustment layer, the first element group comprises at least one first element, and transparency of the at least one first element is adjustable;

a light guide structure comprising a plurality of optical fibers disposed at the first light adjustment layer, and distributed between the at least one first element in the first element group, wherein a plurality of first elements in the first element group are in a one-to-one correspondence with the plurality of optical fibers; and a first light source, wherein the first light source is located on a side of the first light adjustment layer, wherein the at least one first element is capable of emitting light emitted from the first light source to a side outside the second light transmission layer and away from the first light adjustment layer.

17. The light emitting assembly according to claim 1, wherein the light emitting assembly further comprises:

a second light adjustment layer, disposed between the first light transmission layer and the second light transmission layer, wherein a second element group is disposed at the second light adjustment layer, the second element group comprises at least one second element, and transparency of the at least one second element is adjustable; and a second light source, wherein the second light source is located on a side of the second light adjustment layer, wherein the at least one second element is capable of emitting light emitted by the second light source to a side outside the second light transmission layer away from the second light adjustment layer.

18. The vehicle according to claim 17, wherein transparency of at least one first element in the first element group is independently adjustable, and the first elements in the first element group are arranged in an array at the first light adjustment layer.

19. The vehicle according to claim 17, wherein the first light source comprises at least one light emitting diode (LED) light, and the at least one LED light is arranged on at least one side of the light emitting assembly; and the light emitting assembly further comprises:

a light emitting circuit, configured to control the at least one LED light to emit light.

20. The vehicle according to claim 19, wherein the light emitting circuit is further configured to control luminance and a wavelength of the light emitted by the at least one LED light.

* * * * *